United States Patent [19]
Rorabaugh et al.

[11] Patent Number: 5,544,607
[45] Date of Patent: Aug. 13, 1996

[54] MOVEABLE SPONSONS FOR HYDROFOIL WATERCRAFT, INCLUDING BOTH LARGE ENTENDED-PERFORMANCE HYDROFOIL WATERCRAFT AND LEAPING PERSONAL HYDROFOIL WATERCRAFT

[76] Inventors: Dale Rorabaugh; Ron Costa, both of P.O. Box 1864, Rancho Sante Fe, Calif. 92067

[21] Appl. No.: 390,500

[22] Filed: Feb. 13, 1995

[51] Int. Cl.$^6$ ................................................ B63B 43/14
[52] U.S. Cl. ................................. 114/123; 114/274
[58] Field of Search ............................. 114/61, 123, 271, 114/274, 278, 283, 284, 292

[56] References Cited

U.S. PATENT DOCUMENTS

| | | | |
|---|---|---|---|
| 3,064,370 | 11/1962 | La Fleur | 114/123 |
| 3,294,055 | 12/1966 | McGuire | 114/274 |
| 3,485,198 | 12/1969 | Matthews | 114/123 |
| 3,827,391 | 8/1974 | Stanberry, Sr. et al. | 114/274 |
| 4,452,166 | 6/1984 | Daniel | 114/123 |
| 4,669,408 | 6/1987 | Schad | 114/283 |
| 4,875,426 | 10/1989 | Soga et al. | 114/123 |
| 4,964,357 | 10/1990 | Genfan | 114/123 |

*Primary Examiner*—Stephen Avila
*Attorney, Agent, or Firm*—William C. Fuess

[57] ABSTRACT

Hydrofoil watercraft (HFWC)—particularly including extended-performance hydrofoil watercraft (E-P HFWC) characterized by a submerged demi-hull mounting hydrofoils, and also high-performance personal hydrofoil watercraft (P HFWC)—are rendered both tractable and pleasant to operate throughout broad operational ranges by the provision of selective upwards (i) flotation and (ii) planing forces from two sponsons moveable in position at the ends of hinged arms. At their maximally elevated, inboard, positions the sponsons are integrated with the contours of the main displacement hull—preferably a "V"-shape hull—so as to permit the HFWC to operate efficiently and handle well while not on plane, including while cutting through heavy seas. In their intermediary, or outboard, positions the sponsons serve to (i) stabilize the hull while the HFWC is stopped or moving slowly while (ii) providing planning surfaces that aid the HFWC to first come up smoothly onto a first plane, and then, at still higher speeds, smoothly onto a second plane on its primary hydrofoils. Once the HFWC is on its second, or hydrofoil, plane, the sponsons as well as the displacement hull are completely out of the water, reducing drag. In yet a third, maximally submersed, position the sponsons extend below and protect the hydrofoils and the propulsion, typically a propeller, so as to thereby permit safe operation of the HFWC in shallow water or during beaching.

16 Claims, 6 Drawing Sheets

MOVEABLE SPONSONS FOR HYDROFOIL WATERCRAFT, INCLUDING BOTH LARGE ENTENDED-PERFORMANCE HYDROFOIL WATERCRAFT AND LEAPING PERSONAL HYDROFOIL WATERCRAFT

BACKGROUND OF THE INVENTION

1. Field of the Invention

The present invention generally concerns hydrofoil watercraft, including both large extended-performance hydrofoil watercraft (E-P HFWC) as are currently under study and evaluation by the military, and personal hydrofoil watercraft (P HFWC) such as have previously been used in recreation.

The present invention particularly concerns extended-performance hydrofoil watercraft (E-P HFWC) that, nonetheless to having hydrofoils that are positionally fixed in extension from the hull, are safe and stable to operate in shallow water, and also in heavy seas when not on hydrofoil plane or when progressing to hydrofoil plane. The present invention also particularly concerns the configuration of smaller, personal, versions of hydrofoil watercraft (P HFWC) so as to be fast and highly maneuverable, including so as to jump free of the water, nonetheless to being (i) stable and pleasant to operate at slower speeds and even to sit upon when stopped, (ii) relatively economical of construction and operation, and (iii) relatively quickly and easily launched, recovered, and transported on land.

2. Description of the Prior Art

2.1 Adjustable (Outboard) Pontoons, or Sponsons

A first aspect of the present invention will be seen to concern floats, or pontoons, or sponsons that are moveable relative both to the main body of a hydrofoil watercraft (HFWC)—including personal hydrofoil watercraft (P HFWC)—and relative to the water in which the hydrofoil watercraft (HFWC) float.

Moveable floats, or pontoons, or sponsons are known in the prior art, including for application to hydrofoil watercraft (HFWC). The sponsons have typically been moveable between (i) positions in the water where hydrostatic or hydrodynamic stability is provided to the HFWC (respectively depending upon whether the HFWC is stationary or moving), and (ii) positions out of the water where—at least occasionally—aerodynamic stability has been imparted to a moving watercraft.

The present invention will later be seen to deploy moveable floats, or pontoons, or sponsons and their associated supporting structures on HFWC including P HFWC. So deployed, the sponsons serve at least three additional, new, purposes to the stabilizing purposes of the prior art.

First, differing sponson positions in the present invention will be seen to accord a very considerably different HFWC flotation. This differing flotation affects, in particular, the depth below water surface of both the hydrofoils and any propeller, or other in-water propulsion mechanism, of the HFWC. In general the sponsons of the prior art, regardless to what type of watercraft applied, have not had such significant displacement, and flotation, so as to affect by their variable positions the waterline of the entire watercraft.

Second, the sponsons of HFWC and P HFWC in accordance with the present invention will be seen to provide, selectively with differing positions of the moveable sponsons and their supporting structure, a ramp surface that helps the HFWC and P HFWC to go onto plane much sooner and slower, and with much less energy, than otherwise. This ability of the moveable sponsons to function as part of the planning hull is a function of (i) their size and bulk, (ii) their positions, (iii) their contours, and (iv) their moveability. Such a function for moveable sponsons is not known to the inventors to be within the prior art.

Third, the sponsons of certain larger, extended performance HFWC, in accordance with the present invention will be seen to expose, in certain positions, an inner, or core, hull to the HFWC. Because of the manner by which the HFWC is lifted on its moveable sponsons and it foils, it is structurally suitable that this inner hull may have a watertight door without hazarding the safety of the vessel. When the HFWC is stopped at sea, or on a beach, or at a pier, then (i) the sponsons may be positioned laterally extended from the core hull, and (ii) this door may be opened to provide excellent access to the interior of the ships hull.

Non-hydrofoil watercraft having moving pontoons that are adjustable on hinged arms in their extension into the water from the body of the watercraft are shown, inter alia, in U.S. Pat. Nos. 3,485,198 for a BOAT WITH FLOTATION SPONSONS; 4,669,408 for an AMPHIBIOUS JET POWERED CRAFT, and 4,875,426 for a FLOAT ATTACHMENT FOR WATERCRAFT. Adjustable outboard "pontoons" are called "sponsons".

A watercraft using stabilizing foils and floats, or sponsons, is shown in U.S. Pat. No. 4,452,166 for a FOIL STABILIZED MONOHULL VESSEL. The vessel leaves its hydrofoils fixed in position while the watercraft is stabilized in the water by the repositioning of floats, or sponsons. The floats are intended to rest upon the water when the vessel is at rest or low speeds, and to be removed from the water (the stabilization function being more substantially assumed by the adjustable foils) when the vessel is at high speeds.

Personal hydrofoil watercraft again using moveable floats, or sponsons, for purposes of stabilization are shown in U.S. Pat. No. 3,294,055 for a WATERCRAFT and U.S. Pat. No. 4,964,357 for a PLANING BOAT.

2.2 Accommodations of Hydrofoil Watercraft to Operation in Shallow Water

The hydrofoil(s) and the propulsion drive assembly(ies) of a hydrofoil watercraft (HFWC) necessarily extend (at least when the watercraft is operative) into the water below the hull of the HFWC. These extensions present challenges to the (i) operation of the HFWC in shallow water, (ii) maneuvering of the HFWC in shallow water whether or not under its own power, and/or (iii) pulling of the HFWC up an inclined ramp onto land or onto a land transport trailer or vehicle. "Shallow water" is defined as any water insufficiently deep so as permit an adequate safe clearance between the bottom and either or both of the hydrofoil(s) and/or the propulsion drive assembly(ies) of the HFWC when the HFWC is (i) either loaded or unloaded and (ii) either moving or stationary within the water.

A common solution to safely bringing a HFWC having downwards extending hydrofoils and/or propulsion assemblies into shallow water is to mechanically raise these assemblies relative to the hull of the HFWC. The required raising is accomplished by diverse forms of mechanical assemblies including mechanisms for linear retraction and for hinged swinging. Because a hydrofoil assembly must be sufficiently robust so as to at least partially support the weight of the HFWC when the HFWC is on hydrofoil plane, and because the propulsion assembly of the HFWC must be sufficiently robust so as to deliver the force propelling the HFWC through the water (including at speeds causing the watercraft to go onto hydrofoil plane), both hydrofoil and propulsion assemblies are typically relatively massive and strong, and are normally made from steel. Creating moveable or hinged mounts for these massive assemblies normally requires commensurately strong, and expensive, mechanical sub-assemblies.

The present invention will be seen to reject the approach of mechanically raising the hydrofoil(s) and/or the propulsion drive assembly(ies) of a HFWC during use of such HFWC in, or the transport of HFWC through, shallow water, or during the extraction of HFWC along a ramp from water (that is necessarily shallow at the foot of the ramp) onto land. Instead of raising either or both its hydrofoil(s) and/or its propulsion drive assembly(ies), a powered HFWC in accordance with the present invention will be seen to leave both these assemblies absolutely fixed in position (at least as regards in their extension below the hull of the HFWC). Instead of raising its hydrofoil(s) and/or its propulsion drive assembly(ies), a HFWC in accordance with the present invention will be seen to effectively "enlarge the hull", therein increasing its buoyancy and floating the hull higher in the water. Consequently to the hull floating higher in the water the hydrofoil(s) and the propulsion assembly(ies) that are (fixedly) connected to the hull also float higher in the water. In fact, they float so high that, while still in the water, they are no longer constitute the lowermost extension of the HFWC.

Exactly how this "enlargement of the hull" is accomplished will be taught later in this specification. The hull is normally so effectively "enlarged" by use of floats (or pontoons, or sponsons) and/or gas bags. Therefore the use of HFWC in shallow water, and the extraction of such HFWC onto land, will, in the present invention, prove to be related to the sponsons discussed in the previous section 2.1. For the moment, however, it is sufficient to understand that, while moveable floats (including moveable floats in the form of sponsons) are known for use with watercraft, including for HFWC, the sponson-type floats of the present invention are used in a manner, position and degree to which is, to the best knowledge of the inventors, unlike the purposes for which, and the ranges over which, any of floats, pontoons or sponsons have previously been used.

SUMMARY OF THE INVENTION

The present invention contemplates hydrofoil watercraft (HFWC)—particularly including both extended-performance hydrofoil watercraft (E-P HFWC) and high-performance personal hydrofoil watercraft (P HFWC)—having moveable sponsons so as to realize safe, smooth and efficient operation both on and off hydrofoil plane, and in transitioning from and particularly to hydrofoil plane, in all conditions of sea state and water depth.

In particular, the moveable sponsons permit realizing such a smooth operation of a HFWC off hydrofoil plane in rough water, and such a safe operation of a HFWC off hydrofoil plane in shallow water, as have previously been rare. In particular, the moveable sponsons aid the transition of a HFWC to hydrofoil plane. This aid is so effective that a P HFWC, in particular, may employ but two only quite small hydrofoils. These two hydrofoils—while optimally small in support of spectacular P HFWC performance including high speed planing over the surface of the water, tight turning, and jumping clear of the water—are so small that, but for the help of the moveable sponsons, driving the P HFWC onto plane would require an engine of more power, and commensurate weight, than is desirable for best performance.

Hydrofoil watercraft (HFWC) in accordance with the present invention have, in effect, dynamically reconfigurable hulls. The dynamic hull reconfiguration of support high performance in different operational regimes. In particular, the moveable sponsons and associated structure of the present invention accord a HFWC both (i) a considerably different flotation/center of gravity/effective beam with varying sponson positions, and (ii) a ramp surface aiding the HFWC both to go onto plane at the surface of the water, and then to rise even further onto hydrofoil plane above the surface of the water.

The principle means, and mechanism, by which a hydrofoil watercraft (HFWC) in accordance with the present invention is made tractable, safe and pleasant to operate throughout its entire operational range is by a selectable (positional) deployment of moveable flotation devices, or sponsons. The sponsons have a strong effect on each of (i) the flotation, (ii) the center of gravity, (iii) the effective beam/propensity to sideslip, and (iv) the through-the-water-resistance/planning surfaces of the HFWC.

In accordance with the present invention, a flotation device is movably connected to the hull of a HFWC. The flotation device normally consists of a several, normally two, floats, or sponsons, that are attached to the ends of hinged arms—but inflatable bags may alternatively be used. The sponsons on the ends of the hinged arms are continuously adjustable in position between (i) a full up, "inboard", position where they are closely proximate too, and integrated with the shape of, the hull, and (ii) a full down position substantially underneath the HFWC, to each side of its (preferably two) hydrofoils, and extending into the water to a depth greater than the hydrofoils. Between these two positions the movably hinged sponsons may at least assume and stably hold (iii) a third, full "outboard", position where the sponsons and their hinged arms extend substantially horizontally from the hull of the HFWC in the manner of the wings of an airplane.

The effect of the moveable sponsons that is easiest to understand is the protection that they accord to the (two) hydrofoils and to the propulsion of the HFWC in their full down position. The sponsons protect the (two) hydrofoils and the propulsion not only from the bow, but also from the stern and athwartships. They permit safe operation of the HFWC (i) in shallow water, (ii) during beaching, and (iii) during launching from, or retrieval onto, a land trailer.

The effect of the moveable sponsons that is next easiest to understand is the effect that they have on flotation and effective beam when the HFWC is stationary. When the sponsons are in their full down positions they tend to float the hull of the HFWC high. Particularly in the embodiment of the present invention as a personal hydrofoil watercraft (P HFWC), the floating of the hull high in the water makes a pleasant seat for the operator/user of the P HFWC in the sunshine relatively high above the surface of the water.

Conversely, when the sponsons are in their full up positions then a portion of each sponson will be out of the water, the HFWC floating on the combined volume of its sponsons and its hull. Such a relatively low position may be desired for better cooling by action of wetting with waves. Extension of the sponsons to their full outboard positions is without appreciable effect on the buoyancy of the hull-sponsons combination, but can have a great effect on HFWC stability in each of pitch and roll. Depending upon the height and peak-to-peak size of the prevailing waves, and the angle of the bow-stern axis of the HFWC relative thereto (and also on the movement(s) of the operator/user of a P HFWC), the HFWC will generally be somewhat more stable with its sponsons in their full outboard positions. In the embodiment of the invention as a P HFWC, these full outboard position the sponsons and their supporting arms continue to make convenient footrests while (i) providing surfaces upon which things can be set, as during fishing, and (ii) providing outboard floats which swimmers (or, if moving, in-water body surfers) may grab.

The more complex, and the more useful, effects of the moveable sponsons are dynamic. They permit the use of a hull type—a displacement hull, and particularly a "V" hull—that functions exceedingly well to "plow" through the water at low speeds, and to cut through heavy seas, in a manner that a planning hydrofoil hull does not. They permit the HFWC to come up onto, and to drop off, hydrofoil plane quickly, gracefully and smoothly in all sea conditions, with a minimum of power expended, waves and splashes made, and lurching. They permit an entire new operational range of the HFWC—faster than displacement motion through the water but slower than at least that speed at which the HFWC goes onto its hydrofoils (if not always also the lowest speed maintainable once on hydrofoil plane)—where the HFWC planes on its sponsons (and, to a varying lesser degree, its hull and foils).

A HFWC so constructed has a displacement hull of a shape (i) suitable to slice through heavy seas but, (ii) but insufficiently providing at a first speed of the HFWC through the water any first lifting force by which the HFWC may come onto a first plane on its hull. "Insufficiently providing ... any first lifting force" is simply a way of saying that the displacement hull does not suffice to be a planing hull at the first speed of the HFWC. In actual fact, the displacement hull is preferably of a "V" shape. Although a HFWC of this hull shape can sometimes be caused, before coming onto its hydrofoil plane and unaltered by the sponsons discussed below, to make only partial contact between the surface of the water and the stern of the hull—normally only under conditions of heavy seas—the "V" shape hull is generally unsuitable for planning, as will be recognized by nautical architects.

The moveable sponsons of the present invention accord, in certain larger extended performance HFWC, still further advantages. When the moveable sponsons are extended laterally the they expose an inner, or core, hull to the HFWC. In the various operation regimes of the HFWC, it will be understood that this inner hull is either (i) protected by the sponsons in their retracted position, or else (ii) the HFWC is on sponson plane or on a hydrofoil plane and water may not even touch the inner hull, let alone exert any great pressure against the inner hull, or else (iii) the HFWC is stopped or proceeding slowly, minimizing hydrodynamic strain on the inner hull. Because the inner hull is never highly stressed, it is structurally suitable that it should have and define at one or both sides such a large watertight door, or hatch, as would be unsafe in hull of a conventional vessel even should the vessel be unloaded to such extent as the door might be entirely above the waterline. When the HFWC is stopped at sea, or on a beach, or at a pier, then (i) its sponsons are positioned laterally extended from the core hull and downwards into the water to such extent as elevates the door safely above the water line, and (ii) the side hatch may then be opened to provide excellent access to the interior of the ships hull. For example, a jeep or other land vehicle may normally be embarked and disembarked from the HFWC through its side, including over the exposed upper surface of a sponson and onto a beach. A HFWC in accordance with the present invention is thus of the order of an amphibious landing craft in that it may both (i) come close to shore, and onto a beach, and (ii) disembark men and machines. It is the first HFWC—a vessel that by definition can rise onto a hydrofoil plane—known to so function.

These and other aspects and attributes of the present invention will become increasingly clear upon reference to the following drawings and accompanying specification.

DESCRIPTION OF THE PREFERRED EMBODIMENT

Before directly discussing in section 3, following, the moveable sponsons in accordance with the present invention that support that HFWC should realize superior performance over a broad operation range, the hulls and the performance of certain HFWC to which the sponsons of the present invention are preferably attached are first discussed in the following sections 1 and 2. In this manner the limitations of these HFWC—despite their superior form—that are overcome by the moveable sponsons of the present invention may best be appreciated.

1. A HFWC Hull and Hydrofoil Structure Offering High Performance In Different Operational Regimes Each of the hull, the propulsion and the hydrofoils of a HFWC in accordance with the present invention are simply, sparsely and cleanly designed so as to provide maximum performance and reliability at minimum weight and cost. Unfortunately, the same design features that promote these beneficial objectives are occasionally antithetical to the special requirements of a HFWC to operate in two modes: both on hydrofoil plane and not on hydrofoil plane with its hull in the water.

1.1 A V Hull, Excellent for Rough Seas, is Ill-Suited as the Only Way By Which a HFWC May Rise In the Water Prior to Rising Still Further Onto A Hydrofoil Plane For example, the main hull is preferably a slender monohull according but a low resistance to movement through the water. (In an extended-performance hydrofoil watercraft characterized by a submerged demi-hull mounting the propulsion drive, the demi-hull is also long, slender and hydrodynamically slick.) The preferred main hull is of a "V" cross-sectional shape, with the sides of the "V" deeply channeled and contoured similarly to an exaggerated lapstrake construction. Both these aspects of hull design—which are well proven for hulls that must cut through the water, and through heavy seas, as opposed to planing on top of the water—would be expected to be unusual, if not antithetical, of being used in any watercraft that must at times plane upon its hull prior to rising onto its hydrofoils.

1.2 In the Water (Inside a Demi-Hull) or Above the Water (Within a Main Hull of a HFWC on Hydrofoil Plane) The Necessary Engine Is Troublesome to the Rise of a HFWC Onto Hydrofoil Plane For example, in the particular embodiment of the present invention as a P HFWC, the engine is preferably located midships for balance. A drive line runs directly from the engine within the hull to a steerable propeller or water jet located in the water below and to the aft of the engine—making thereby an efficiently short mechanical drive connection. This means that the engine, which is within the main hull, is out of the water when the P HFWC is on hydrofoil plane. This means that the engine of the P HFWC, as well as the hull and the operator, must be lifted out of the water when the P HFWC is driven onto hydrofoil plane. This combined weight—which constitutes the entirety of the P HFWC except for the hydrofoils and the propulsion drive—must either be raised on large hydrofoils or upon smaller hydrofoils propelled through the water at high speed, Large hydrofoils are inefficient once the P HFWC reaches hydrofoil plane. Small hydrofoils require a large engine to be propelled through the water quickly—which woks against the ability to raise the engine (within the hull) when the P HFWC goes onto hydrofoil plane in the first place.

Conversely, and as an alternative example, in the particular embodiment of the present invention as a E-P HFWC with a demi-hull, the engine and fuel storage in the demi-hull are adjusted to provide fore-aft balance. A straight drive line runs directly from the engine within the demi-hull to a propeller or water jet—making thereby an efficiently short mechanical drive connection. In accordance with the advanced design of an E-P HFWC, the demi-hull is not raised from the water when the E-P HFWC goes onto hydrofoil plane. Indeed, the hydrofoils are commonly affixed to the demi-hull. This is considered the primary advantage of the whole design. Alas, putting and leaving too much structure below the water tends to defeat the entire purpose of efficient water-borne transit via hydrofoils. Moreover, insofar as the structure below the water is critical to HFWC operation—as are the engines—then vessel operability and even safety is sacrificed if the watertight integrity of the demi-hull is breached. But consider where the demi-hull is. It, and the foils, are lowermost in the water. Accordingly, an E-P HFWC is, although of a very appealing functional design, plagued by the possibility of serious mission—or safety-hazarding damage should the demi-hull come into contact with the bottom. Since E-P HFWC are primarily in military service, and the high speed of hydrofoils is especially useful in evading shore armament gunfire in littoral warfare, it is no small problem that the demi-hull of the E-P HFWC design is unduly subject to damage from grounding.

1.3 Even the Lowly Steering Gear and Adjustable Hydrofoils Are Troublesome to the Rise of a P HFWC Onto Hydrofoil Plane For example, in the embodiment of the present invention as a P HFWC the steering gear is moveable both fore and aft, and from side to side, in the manner of an aircraft joystick. By this movement the planes of the hydrofoils are varied and, in a variant embodiment of the invention, the thrust axis of the propulsion is also varied. However, the same movement of the hydrofoils that accords extreme, and extremely flexible, control also may serve to make the hydrofoils "sensitive" to the delicate control problem when the P HFWC is just coming onto hydrofoil plane. If the hydrofoils are small (which is desirably the case for efficiency, and which is the case in the preferred embodiment of a P HFWC in accordance with the present invention, then the hull of the P HFWC must of necessity—but for the action of the moveable sponsons to be explained—be driven through the water at great speed in order to get the P HFWC to rise onto hydrofoil plane. While this is happening the area of the hull is massive relative to the control area of the hydrofoil planes. This means that control is minimal. The P HFWC is typically pointed in a straight line with engine throttles advanced to the maximum while the user/operator must hold on strongly until the HFWC, "thrashing" its way through the water, lurches onto hydrofoil plane. Although amusing, this operation does not inspire confidence that the user/operator is in full control of his/her powerful watercraft.

1.4 It is Very Hard and Energy Intensive for a HFWC to rise onto Hydrofoil Plane on the Same Hydrofoils That Are Desirably Small for Efficiency While on Hydrofoil Plane For example, in the embodiment of the present invention as a P HFWC the hydrofoil suspension of the P HFWC is based on two, as opposed to one, or to three or more, in-water hydrofoil assemblies (each of which may, and does, mount plural hydrofoils). A single, unitary, hydrofoil assembly must be long, if not also wide, relative to the length, and beam, of the HFWC if the HFWC is to be balanced thereon. Such a large hydrofoil assembly risk having a high drag. Three or more separate hydrofoil assemblies also risk high drag, and the possibility that one or more assemblies will come out of the water, affecting stability, during turns. Two (only) hydrofoils are optimal, ensuring both high maneuverability and high efficiency.

Moreover, a very substantial portion of the hydrofoil surfaces of both bow and stern hydrofoil assemblies—the sole "undercarriage" of the P HFWC when it is planning on its hydrofoils— are adjustable. Moreover, at least a major hydrofoil "wing" located at the stern, and preferably also a similar but smaller hydrofoil "wing" located at the bow, is preferrably anhedral, or less preferrably dihedral—but not straight, or as a conventional "airplane-wing"—in configuration.

The (i) high areal percentage of each hydrofoil that is angularly adjustable by the steering gear relative both to the P HFWC itself and to the water, the (ii) large permissible range of hydrofoil adjustment angles, and the (iii) ability of the P HFWC to keep its hydrofoils in the water during almost all sea conditions, combine to make the P HFWC capable of assuming great extremes of attitude in each of roll, pitch and yaw.

However, it is very hard and energy intensive for a HFWC or P HFWC to rise onto hydrofoil plane on the same hydrofoils that are desirably small for efficiency while on hydrofoil plane. Accordingly, there is often a design compromise between the optimal size of the hydrofoils for HFWC operation while on hydrofoil plane and the size of the same foils that proves necessary to permit the HFWC to reach hydrofoil plane in the first place.

2. High Performance In Different Operational Regimes is Seemingly Irreconcilable Alas, the particular embodiment of the invention as a two-point hydrofoil P HFWC so far described is akin to a racing motorcycle. While understandably very fast and very maneuverable on its modestly sized and greatly adjustable hydrofoils, such a "sparse, lean and mean" P HFWC would be expected to (1) sit low in the water when stopped. This is because it is hard to figure out where any significant flotation volume can come from in a P HFWC (having a reasonable hull aspect ratio) that must have and present a frontal area of sufficiently modest size so as to permit the P HFWC to realize sufficiently fast speeds so as to rise onto its hydrofoils.

Alas, even if there was significant flotation volume, the two-point P HFWC so far described would also be expected to (2) rock strongly with wave action, and to (3) handle poorly in high seas. This is because the hull of such a P HFWC must again be hydrodynamically suitable to permit acceleration of the P HFWC to hydrofoil planing speeds. Quite simply, this seems to dictate that the hull of the P HFWC should be a planing, or modified planing, hull—as opposed to a "V" hull that, while providing optimal stability and handling in high seas, would be manifestly unsuitable to permit the P HFWC to come onto plane, let alone onto its hydrofoils. A compromise between stability and speed in the hull configuration for a P HFWC does not seem possible. Alas, a pure planing hull on a P HFWC would be expected to be (4) unwieldy at best, or even impossible, of permitting acceleration of the P HFWC in heavy seas—nonetheless that if the P HFWC could somehow reach a plane on its hydrofoils then it might well exhibit superior stability in rough seas.

Alas, such a "sparse, lean and mean" P HFWC would be expected to (5) expose its prominent downwards-extending hydrofoils to damage from contact with the bottom in shallow water, or with the shore during launchings, groundings and retrievals.

Alas, such a "sparse, lean and mean" P HFWC would be expected to (6) come up onto plane on its two small hydrofoils only but with difficulty, massive infusions of power, and/or a great spraying of water onto its occupant.

In summary, the two-point, high performance, P HFWC so far described would be expected to be suitably "wet and wild", but very "rough edged" for use by beginners, by children, or by owner-operators desiring any other function of a P HFWC other than racing and extreme performance. However, such limitations in usage are not desirable. If the truth be known, even aggressive operators cannot be expected to be comfortable in speeding and/or jumping a P HFWC at or near its performance threshold during each and every minute of use. Moreover, the sea state in which the P HFWC is used cannot be controlled, nor always reliably predicted. The present invention substantially solves each of these problems 1–6 without detracting from the overall high performance of the P HFWC.

3. Hydrofoil Watercraft (HFWC) of the Present Invention Have Dynamically Reconfigurable Hulls to Support High Performance In Different Operational Regimes; Moveable Sponsons and Associated Structure Accord Both (i) A Considerably Different HFWC Flotation/Center of Gravity/Effective Beam with Varying Sponson Position, and (ii) A Ramp Surface Aiding the HFWC to Go Onto Hydrofoil Plane A first preferred embodiment of the present invention as a personal hydrofoil watercraft (P HFWC) 1 is shown in FIGS. 1–7 and 10. The P HFWC 1 mounts a downwards-extending bow hydrofoil assembly 11 and a stern hydrofoil assembly 11, each preferably consisting of a number of hydrofoils. These hydrofoil assemblies 10, 11 are permanently affixed to the hull and extend into the water 2 (shown in FIGS. 3–7) below the hull.

The overall dimensions of the hydrofoil P HFWC 1 are typically four meters (4 m) length by three meters (3 m) beam by two meters (2 m) height from keel 21 to the top of the steering gear 25—although none of these dimensions, nor their relative ratios, are crucial to the present invention. The front hydrofoil assemblies 10 typically extends one meter (1 m) into the water below the keel 21 at an approximate backwards-swept angle of fifteen degrees (15°) while the rear hydrofoil assembly 11 typically extends more than one meter (>1 m) into the water below the keel 21 at a similar backwards-swept angle of fifteen degrees (15°). The entire hull 20 is typically made from a high strength composite material such as, for example, fiberglass reinforced with carbon fiber or Kevlar® fiber (Kevlar® is a registered trademark of E. I. du Pont de Nemours and Company)

Figures 3, 4:
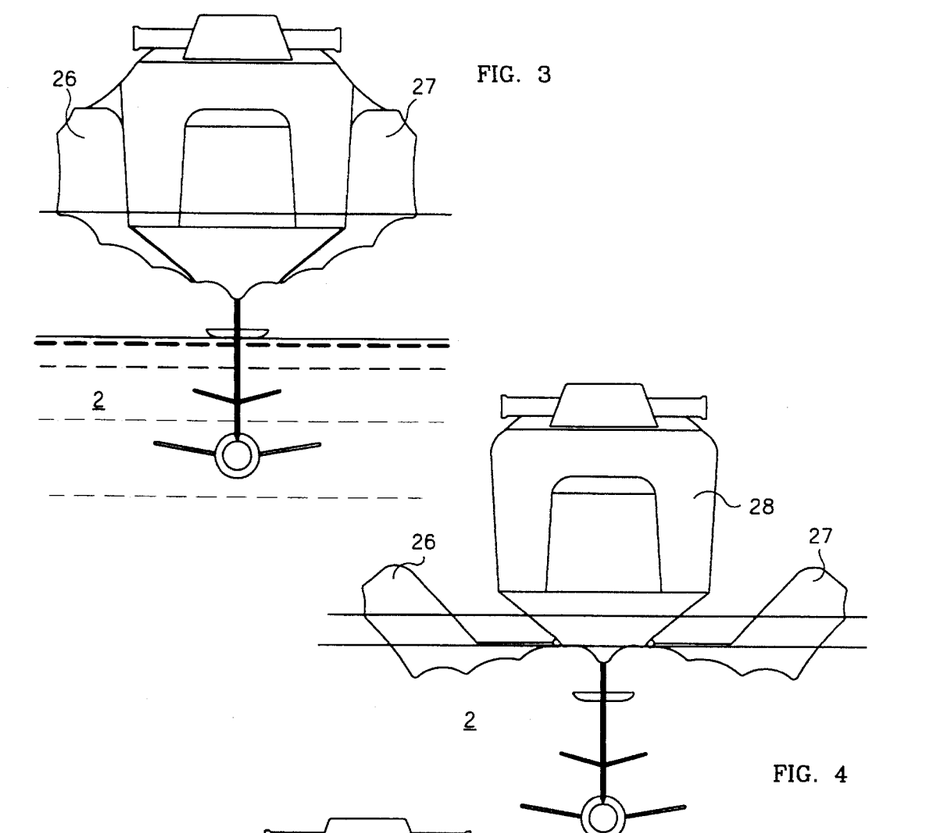
FIG. 3 is a front plane view showing a first, uppermost, position of three alternative positions of the moveable floats, or sponsons of the embodiment of the present invention as a P HFWC; the water level varying relative to the P HFWC depending upon whether the P HFWC is (i) stationary or (ii) on hydrofoil plane.
FIG. 4 is a front plane view showing a second, intermediary, position of three alternative positions of the P HFWC's moveable floats, or sponsons; the water level varying moderately relative to the P HFWC depending upon whether the P HFWC is (i) stationary or (ii) in motion.

The hydrofoil assemblies 10, 11 provide at a certain speed of the hydrofoil P HFWC 1 through the water 2 a lifting force by which the hydrofoil P HFWC 1 may come onto a hydrofoil plane. The position of the waterline when the P HFWC 1 is on its hydrofoil plane proceeding in a straight ahead direction without any roll or yaw is shown in FIG. 3 as WATERLINE, P HFWC LEVEL ON HYDROFOIL PLANE.

Meanwhile, the shape of the hull 20 to the P HFWC 1 is preferably in the substantial cross-section of a capital letter "V", and is further preferably possessed of several contoured channels 22, 23, 24—all as is illustrated. The overall "V" shape of the hull 20 renders the P HFWC 1 quite effective to cut through the water 2, including the cutting through heavy seas at even at moderately high speeds (short of such speeds as the P HFWC 1 obtains on hydrofoil plane).

It is neither rare nor unusual that a hydrofoil watercraft (HFWC), and the P HFWC 1 of the present invention, should have to cut through the water as opposed to planing on top of the water.

In the first place, the P HFWC 1 is compact relative to its weight, meaning that it does not have a great deal of positive buoyancy (as is common among HFWC of all types) and sits low in the water. Especially when loaded with one or more human riders that may weigh up to several hundred pounds each, the P HFWC 1 does not have a large freeboard, and has a considerable depth of keel (without even including the hydrofoil assembles 10, 11), relative to these ratio on other types of watercraft. It is, of course, acceptable that the rider-operators of the P HFWC 1 should be lower in, and less isolated from, the water 2 than they would normally be in other watercraft since the primary purpose of the P HFWC 1 is recreational, and its rider-operators, likely attired in bathing suits or similar wear, expect to become wet.

In the second place, the P HFWC 1 must necessarily cut through the water if it is to move at all at speeds less than that speed that is required to come onto hydrofoil plane.

In the third place, there are certain sea state conditions when it is not feasible to ride the P HFWC 1 on hydrofoil plane.

Accordingly, the substantially "V"-shaped hull 20 of the P HFWC 1 is a very satisfactory shape for low speed operation. This should come as no surprise because the "V" shape is the predominant hull shape of all the ships in the world, as well as most pleasure craft. However, this "V" shape hull presents two considerable limitations.

In the first place, the resistance of a "V" shaped hull to wave-induced roll is poor. Large ships of "V"-shaped hull configuration counteract roll sensitivity by the use of ballast. Ballast, or dead weight, is not desired for a HFWC, or P HFWC, that must at times rise onto hydrofoil plane.

In the second place, a "V"-shaped hull, or even a modified "V"-shaped hull, are imperfectly adapted for planing. When the hull 20 of the P HFWC 1 of the present invention remains fixed in the contours of the "V" then it typically "plows" through the water. At ever increasing speed considerable volumes of water are typically displaced—typically consuming awesome amounts of power—before, and generally only after the lapse of considerable time and distance, the "V" hull breaks free of the water and "lurches" onto its hydrofoil plane. That it is difficult and energy intensive to get any watercraft to rise onto plane, whether a hull plane or a hydrofoil plane, is well known to maritime engineers and to nautical designers. In actual fact, many hydrofoil watercraft (HFWC) of all sizes—which are supposed to be and generally are energy efficient on hydrofoil plane—have sophisticated and powerful propulsion units not just, or only, so that they may maintain a hydrofoil plane, but rather so that they may speed, and rise in the water, to this desired operational condition in the first place.

According to a desire to overcome both these limitations, HFWC of the present invention each have a plurality of moveable sponsons; typically two such sponsons 26, 27 as are best seen on the embodiment of the present invention as a P HFWC in FIGS. 3–6. Each sponson 26, 27 is hinged to a core 28 of the hull 20. Each sponson 26, 27 is moveable to (i) an inboard position that is so closely proximate to the core 28 of the hull 20 so as to be integrated into the shape thereof. In this position, illustrated in FIG. 3, the sponsons 26, 27 promote that the hull 20 should maintain its "V" cross-section, and be suitable for slicing through heavy seas. When the hull is so traveling through the water, or is stationary, and is not on hydrofoil plane, the water line of the P HFWC is typically as is marked WATERLINE, P HFWC STATIONARY in FIG. 3. The P HFWC 1 may sit even deeper in the water (i.e., exhibit less freeboard) if loaded with, for example, one or more humans.

Figure 5:
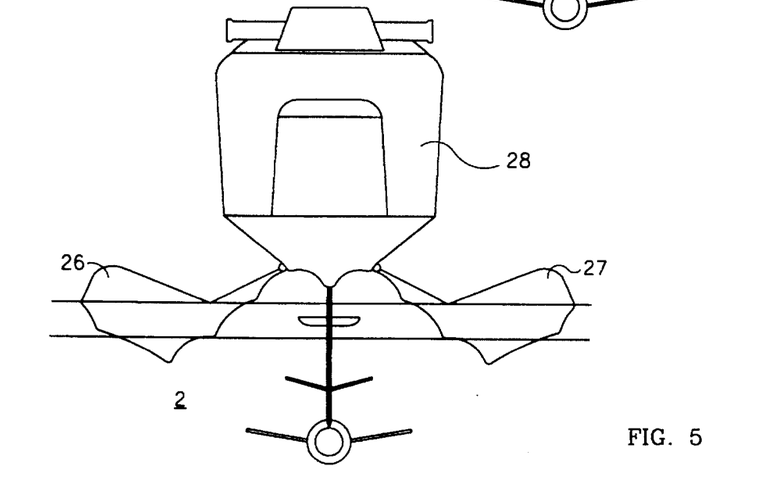
FIG. 5 is a front plane view still showing the second, intermediary, position of three alternative positions of the P HFWC's moveable floats, or sponsons, now slightly progressed downwards from the view of FIG. 4; the water level still varying moderately relative to the P HFWC depending upon whether the P HFWC is (i) stationary or (ii) in motion.

Each sponson 26, 27 is moveable to (ii) a range of outboard positions each of which is positionally separated from the core 28 of hull 20. Two such outboard positions are illustrated in FIGS. 4 and 5. In each position each sponson 26, 27 helps to provide at increasing speed of the P HFWC 1 through the water a lifting force by which the P HFWC 1 may come onto its first, hull, plane.

According to this construction the P HFWC 1 is enabled to come onto its first, hull, plane not exclusively, nor even primarily, by its overall "V" hull 20, nor by the core 28 to this hull 20, but rather by its plural sponsons 26, 27 in their outboard positions. Having reached this planning operational condition, the P HFWC 1 is further aided and abetted, at increasing speed, to come onto its second, hydrofoil, plane on and by action of its hydrofoils 10, 11.

This sequence is illustrated in order in FIGS. 3, 4, 5 and then back to 3. In FIG. 4 the position of the P HFWC 1 relative to the water with increasing speed is shown by the WATERLINE, P HFWC LEVEL ON LOW HULL PLANE. With further downwards hinged distension of the sponsons 26, 27, and likely (but not absolutely necessarily) with increasing speed of the P HFWC 1, the P HFWC 1 will assume that position relative to the water that is illustrated in FIG. 5, with the waterline as is shown by the WATERLINE, P HFWC LEVEL ON HIGH HULL PLANE.

The P HFWC 1 can be maintained in either of its hull planing conditions shown in FIGS. 4 and 5 or, as would be expected, and infinite number of intermediary conditions. However, the high hull plane illustrated in FIG. 5 having been obtained, further increments of speed will cause the P HFWC 1 to rise onto hydrofoil plane. At that time the waterline of the P HFWC 1 will be substantially as is shown by the WATERLINE, P HFWC LEVEL ON HYDROFOIL PLANE of FIG. 3.

FIG. 3 shows, of course, the hinged retraction of the moveable sponsons 26, 27 from their outboard position of FIG. 5 back to their full upwards position from where, in the progression of FIGS. 3, 4, 5, and 3, these moveable sponsons 26, 27 originally started. Once the P HFWC 1 rises onto plane on its hydrofoils, its sponsons 26, 27 may be left in their outboard positions of FIGS. 5 or 4 (and other, intermediary, positions)—but only at the risk and detriment of scrapping the surface of the water, and causing drag, in high seas or in tight turns. Normally the sponsons 26, 27 are retracted as illustrated in FIG. 3, and the P HFWC 1 is ridden like a sea-going motorcycle on its full hydrofoil plane.

Figure 6:
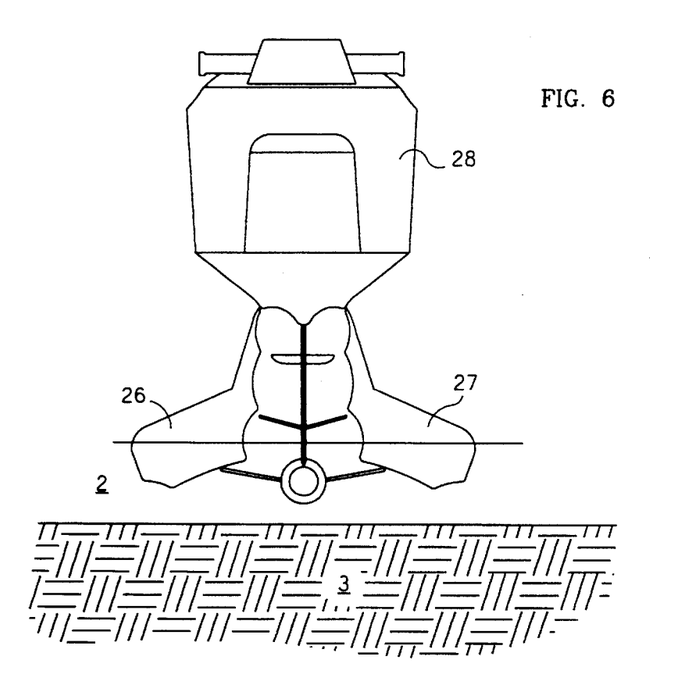
FIG. 6 is a front plane view still showing a third, full down, position of three alternative positions of the P HFWC's moveable floats, or sponsons; the water level varying slightly relative to the P HFWC depending upon whether the P HFWC is (i) stationary or (ii) in motion.
Figure 7:
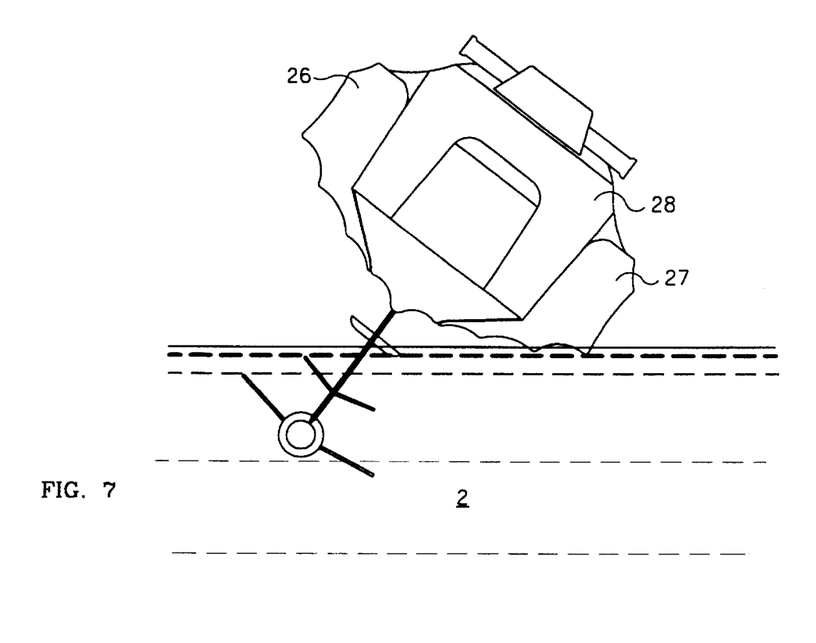
FIG. 7 is a front plane view showing the first, uppermost, position of three alternative positions of the moveable floats, or sponsons, and also the waterline, for the embodiment of the present invention as a hydrofoil P HFWC; the P HFWC shown in process of making a turn on hydrofoil plane.

As previously explained in the discussion of the flotation effects of the sponsons 26, 27, the sponsons 26, 27 are further moveable from their inboard positions (shown in FIG. 3) to their outboard positions (shown in FIGS. 4 and 5) to still yet another, downwards, position shown in FIG. 6. In this position the sponsons 26, 27 extend downwards from the hull 20 sufficiently far so that they are lowermost in the water 2 below the downwards-extending hydrofoils 10, 11. In this their down positions the sponsons 26, 27 contact a shallow bottom or shore 3 of a body of the water 2 in which the P HFWC 1 is operated (shown in FIG. 6) before the hydrofoils 10, 11 do so, physically protecting the hydrofoils 10, 11.

Accordingly, the sponsons 26, 27 of the present invention are not only moveable, but are interactive with the dynamic performance of the watercraft under several different operational conditions. They permit "having the best of multiple worlds" The P HFWC 1 of the present invention can be fairly described as coming up onto, and assuming, its hydrofoil planing position very gracefully and smoothly nonetheless to the fact that, once on plane, its primary hydrofoil control surfaces are designed for optimal speed and maneuverability.

The sponsons 26, 27 also provide the P HFWC 1 of the present invention with an adjustable flotation device. When the P HFWC 1 is deployed in the water 2, the adjustable flotation device of the sponsons 26, 27 provides the core 28 of the hull 20, and the entire P HFWC 1, with in an upwardly directed flotation force. The magnitude of this force is completely adjustable—at least upon such times as the core 28 of the hull 20 and the sponsons 26, 27 are in positions relative to each other, and relative to the water 2, so that the sponsons 26, 27 are at least partially immersed within the water.

Figure 1:
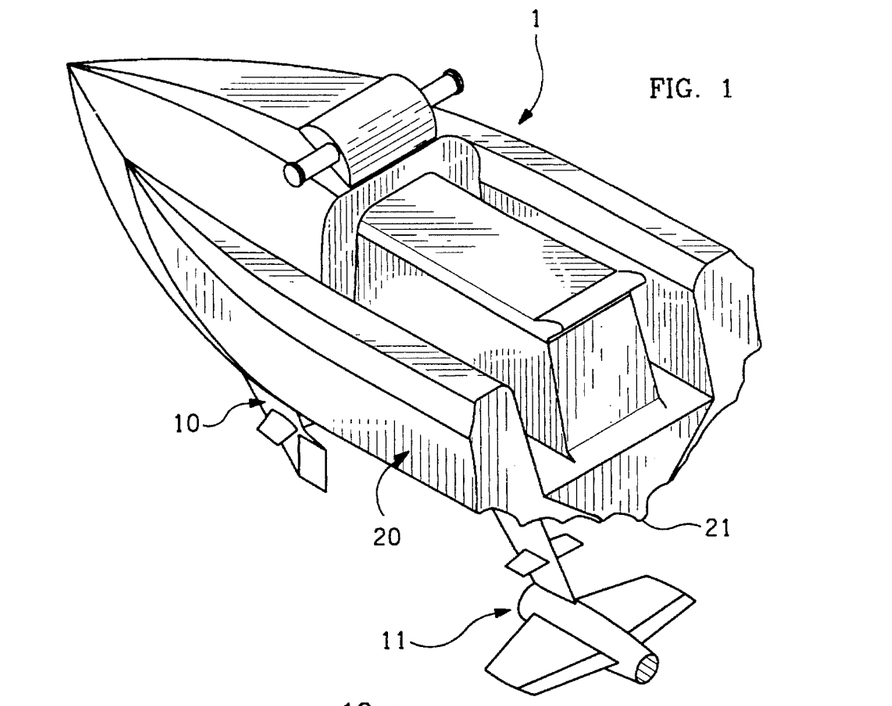
FIG. 1 is a diagrammatic perspective view, taken from and elevated position off the port rear quarter, showing a preferred first embodiment of the present invention as a personal hydrofoil watercraft (P HFWC).
Figure 2:
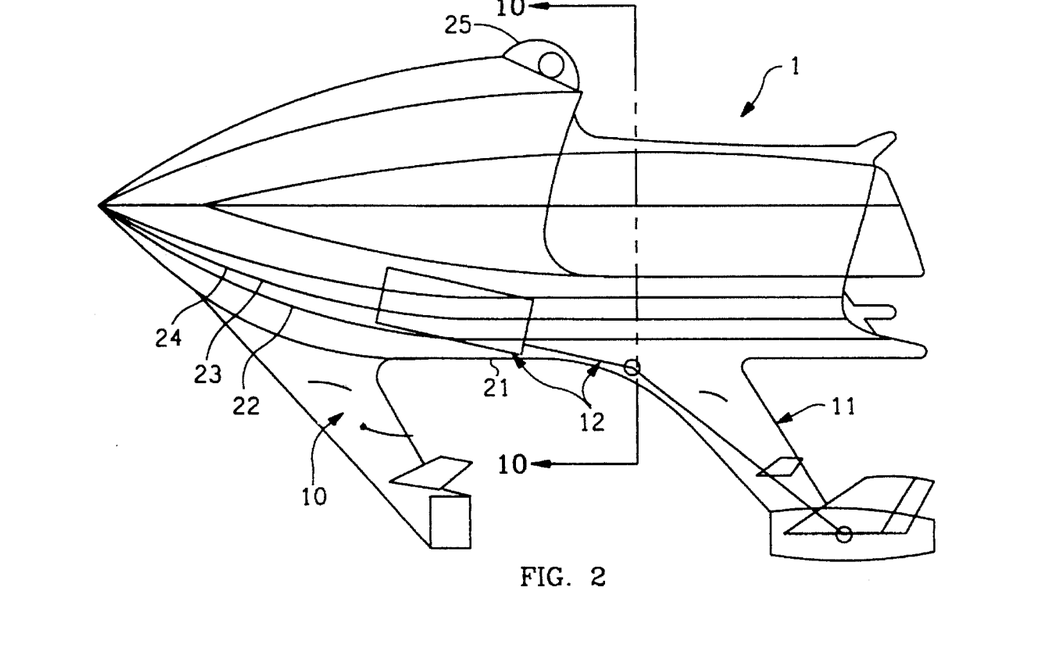
FIG. 2 is a side plan "x-ray" view of the preferred first embodiment of the present invention as a P HFWC previously seen in FIG. 1, the view particularly showing the propulsion power train linkage.

A relationship between (i) the propulsive power of the P HFWC 1, (ii) the lift of the watercraft's hydrofoils 10, 11, and (iii) the lift of the adjustable sponsons 26, 27 is such that, when the sponsons 26, 27 are adjusted for maximum flotation, then the upward flotation force provided to the P HFWC 1 is sufficient so as to do two things. First, the adjustment of the sponsons 26, 27 for maximum flotation—as is shown in FIGS. 5 and 6 and any intermediary positions—will lift the core 28 of the hull 20 (the hull 20 is shown in FIG. 1), and an operator-user sitting upon this core 28, to a position substantially above the water. In this condition the waterline will be at the (identical) location as is illustrated in each of FIGS. 5 and 6 as WATERLINE, P HFWC STATIONARY.

This relatively "high and dry" location is pleasant for the operator, especially during stationary fishing or relaxing in smooth water, or during slow speed cruising. Second, use of the moveable sponsons 26, 27 as a flotation device will serve to lift the propulsion unit of the P HFWC 1—whether a propeller or a water jet—and also its hydrofoils 10, 11 (which propulsion unit and hydrofoils 10, 11 are both ultimately connected to the hull 20) to positions proximate the surface of the water 2. This suitably positions each of the lifted hull 20, the lifted propulsion unit, and the lifted hydrofoils 10, 11 for operation of the P HFWC 1 in shallow water. This positioning is the case regardless that the propulsion of the P HFWC 1 should, or should not, be propelling the P HFWC 1 through the water, under such force as would, but for the retarding presence of the sponsons 26, 27 extending downwards into the water, be sufficient to force the P HFWC 1 to plane upon its hydrofoils 10, 11. More commonly, the engine of the p HFWC 1 is not under a high throttle setting, and is likely even shut down, when the moveable sponsons 26, 27 are adjusted for maximum flotation (as is shown in FIGS. 5 and 6).

The same relationship between (i) the propulsive power of the P HFWC 1, (ii) the lift of the its hydrofoils 10, 11, and (iii) the lift of its sponsons 26, 27, is such that when the sponsons 26, 27 are adjusted for minimum flotation then the flotation force is zero or de minimis relative to the lifting force of the hydrofoils 10, 11 upon during such time as the P HFWC 1 is on plane. The zero flotation force condition is, quite obviously, illustrated in FIG. 3 when the P HFWC 1 is on hydrofoil plane, and when the waterline relative thereto is as is marked WATERLINE, P HFWC ON HYDROFOIL PLANE. The sponsons 26, 27 are obviously completely clear of the water 2.

More generally, however, the adjustable flotation of the moveable sponsons 26, 27 when adjusted to minimum flotation (i.e., the sponsons are elevated, even if not maximally so) provides but very little resistance to the forward motion of the P HFWC 1 when it is being driven through the water. This means more than just that (i) the outside (towards the water 2) shape and contours of the sponsons 26, 27 integrate well into the overall shape of the hull 20. It means that (ii) the inside (towards the hull core 28) shape and surfaces of the sponsons 26, 27 create a "flow channel" between themselves and the core 28 of the hull 20 that readily permits water flow in a relatively efficient manner.

To fully understand this point, it is necessary to consider why the sponsons are preferably hinged where, and as, they are so illustrated to be hinged, or about half-way from the waterline to the keel of the hull 20 when stationary. Moveable, hinged, sponsons could obviously be attached anyplace between, or even above, the waterline to the keel. If the sponsons are attached, and hinged, high, and near to the waterline, of the hull 20 then they, when appropriately hydrodynamically contoured to their forward ends, will pick up responsibility for almost all of the lifting of the P HFWC 1 onto its "hull" (really, in this case, its "sponson") plane. This situation, wherein the lifting potential of the hull is forfeit, is not desirable.

Consider, conversely, what would happen if the sponsons were hinged at the keel. They will again negatively impact any (beneficial) hydrodynamic effect of the core 28 of the complete and entire hull 20 in promoting that the P HFWC 1 should come onto its first, hull, plane. Moreover, consider low speed operation with the sponsons in the water. Sponsons hinged to the hull's keel must either be (i) truncated, and thus under the water, or (ii) extremely contoured to their forward ends, mimicking the curvature of the bow. In the (i) first case little support for hull planing is provided. In the (ii) case great turbulent resistance is presented to forward motion in the water with the low, keel-hinged, sponsons in outboard positions.

In summary, it is respectfully suggested that simply observing the preferred attachment of sponsons in the P HFWC 1 of the present invention, and then imputing that this attachment of moveable sponsons is straightforwardly obvious, and that it neither would nor could likely be otherwise, is to benefit from hindsight accorded by the present invention. In actual fact, each of the (i) size, (ii) shape (contours) (iii) positions, (iv) attachments, and (v) range of motion of the sponsons 26, 27 is very carefully thought out in the preferred P HFWC in order to accomplish all desired hydrodynamic and hydrostatic goals.

It respectively suggested that, insofar as the sponsons 26, 27 of the real-world implementation of the P HFWC 1 look aesthetically appealing (in a manner, and to a degree, that may not be completely clear in the drawings) then this appeal is probably rooted in the correct, and near optimal, design of their sponsons for their intended function (much as an airplane fuselage might appear to be well-balanced).

Accordingly, the P HFWC 1 might be considered to be possessed of an adjustable flotation device in the form of its two elongate floats, or sponsons, 26, 27. These sponsons 26, 27 are preferable attached to the ends of hinged arms positioned on each side of the core 28 of the hull 20 of the P HFWC 1. The hinged arms may be positioned at a downwards angle by the operator-user of the P HFWC 1 so as to completely and deeply immerse the sponsons 26, 27 within the water 2, providing maximum additional flotation (to the normal flotation of the core 28 of the hull 20). This selective immersion of the sponsons 26, 27 effectively "enlarges" the hull 20, providing enhanced buoyancy. Alternatively, the hinged arms may be positioned at a upwards angle by the operator-user of the P HFWC 1, thereby almost completely extracting the sponsons 26, 27 from the water 2 and providing only but minimum additional flotation to even a stopped P HFWC 1.

Because the full up and full down positions of the two adjustable elongate floats, or sponsons, 26, 27 are already so useful to the performance of the P HFWC 1 of the present invention during different scenarios of its usage, it is surprising to find that the two sponsons 26, 27 have yet another useful purpose. When the two sponsons 26, 27 are extended perpendicularly to the sides of the core 28 of the hull 20 then each sponson 26, 27 and its support arm presents a ramp surface to the forward motion of the P HFWC 1. The two ramp surfaces so formed are generally broader, and larger, than are the hydrofoil surfaces of the primary, performance, hydrofoils 10, 11 located under the hull.

The ramp surfaces presented by the elongate sponsons 26, 27 and their arms (in a certain, horizontally extended, position of the sponsons 26, 27) may be considered to constitute secondary hydrofoil surface to the primary hydrofoil surfaces of the pure hydrofoils 10, 11 that are located under the hull. The secondary hydrofoil surfaces, or ramp surfaces, very efficiently help the P HFWC 1 to rise quickly and efficiently from the water, and up onto a plane resting on its primary hydrofoils 10, 11 (only), in minimum distance and at minimum propulsive force. The P HFWC 1 of the present invention can be fairly described as coming up onto, and assuming, its hydrofoil planing position very gracefully and smoothly nonetheless to the fact that, once on plane, the control surfaces of its primary hydrofoils 10, 11 are designed for optimal speed and maneuverability.

Figure 8:
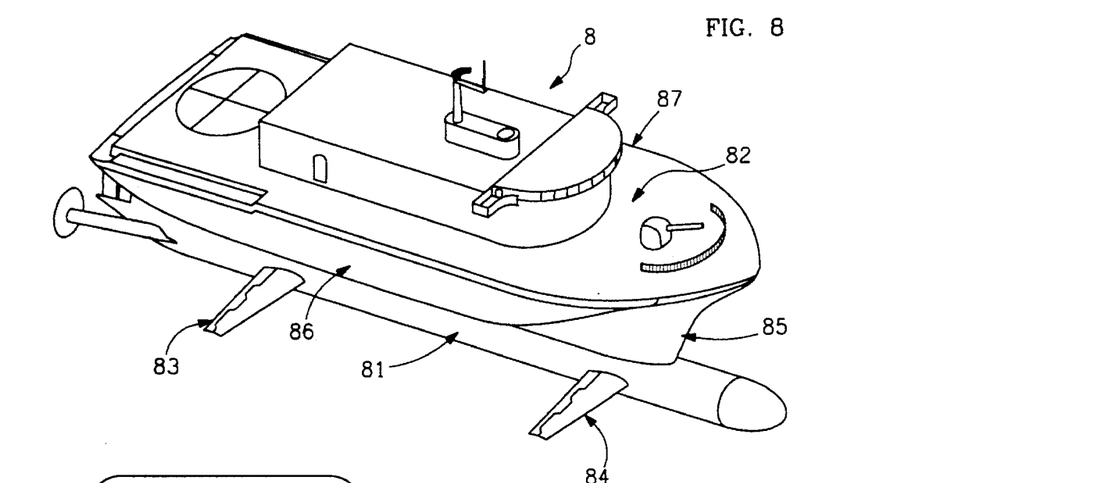
FIG. 8 is a diagrammatic perspective view, taken from and elevated position off the starboard side bow quarter, showing a preferred second embodiment of the present invention as an extended-performance hydrofoil watercraft (E-P HFWC).

A preferred second embodiment of the present invention as an extended-performance hydrofoil watercraft (E-P HFWC)is shown in diagrammatic perspective view, taken from and elevated position off the starboard side bow quarter, in FIG. 8. The contours and gross configuration of the particular E-P HFWC 8 shown in FIG. 8 is very similar to the HYSWAS 4000 configuration—a HFWC designed by the Ecole Nationale Superieure de Techniques Avancees, France. The HYSWAS 4000 HFWC seeks a novel hydrofoil solution to (i) obtain increased speed without loss of endurance and to (ii) obtain improved platform motions to ensure ship's effectiveness regardless of weather conditions. The projected HYSWAS HFWC is to be of 4,000 tons gross weight and TO used in a combination of anti-submarine warfare (ASW), anti-surface warfare (ASUW), and anti-air warfare (AAW). The demi-hull 81 of the HYSWAS HFWC contains at least a portion of the propulsion system including a rearward propeller or water jet, and, typically, a sonar for active and/or passive detection of submarines and torpedoes.

The upper, trimaran, hull 82 of the HYSWAS HFWC design has a length of 90 meters whereas the lower, or demi-, hull 81 is 95 meters long. The upper hull displacement is about 410 tons. The beam is 27 meters, or the same as the overall span of the foils 83, 84. The lower, or demi-, hull 81 has a design diameter of 6 meters and displaces 2,925 tons. The interconnecting strut 85 has a length of 60 meters, a height of 7 meters, a maximum thickness of 2 meters and a water plane area of 102 square meters. The forward foils 84 and aft foils 83, separated by 54 meters on the demi-hull 81, are identical with a semi-span of 10.5 meters, an average chord of 3 meters, and an average thickness of 25 centimeters. Design foil loading is 6 tons per square meter (1248 pounds per square foot), which corresponds to foil lift in the normal foilborne mode of operation of 20% of the ship full load weight. As is typical, each foil 83, 84 has a flap for lift and motion control. The draft of the HYSWAS in hullborne mode is 12.25 meters, whereas in the foilborne mode the draft is 8.75 meters.

The propulsion system of the HYSWAS 4000 HFWC design is slated to be two LM2500 gas turbines having a continuous rating of 25,000 horsepower each. Two high speed clutches connect the engines to a right angle gear drive, then vertically through the strut with a high speed shaft line to another right angle gearbox in the demi-hull. The remainder of the propulsion system normally consists of a reduction gear, main bearing, low speed shaft line and fixed pitch propeller. A water jet propulsion could conceivably be substituted.

The benefit derived from the foils includes not only support of the upper hull 82 above the waves, but full stabilization control when both foilborne and hullborne. Takeoff speed is simulated to be 20 knots with foil immersion maintainable even in a seaway with 5 meter waves once a 25 knot speed is obtained. Maximum sustainable speed is estimated to be 42 knots. The hullborne range at 20 knots is estimated to be 6,000 nautical miles while the foilborne range at 40 knots is estimated to be a very respectable 3,000 nautical miles.

It may appear curious that, since the principles of the present invention are clearly applicable to diverse HFWC, the FIG. 8 depicts a ship (i) not of U.S. design that is (ii) not yet built. The HYSWAS HFWC design is shown because it is, among literally thousands of hydrofoil designs dating from World War II and before, presently believed to be one of the most advanced in terms of its designated goals of (i) increased speed without loss of endurance and to (ii) improved platform motions to ensure ship's effectiveness regardless of weather conditions. Alas, the HYSWAS HFWC design has one glaring problem, especially when assigned to a coastal defense role. If the HYSWAS HFWC design ship ever runs aground then it hazards severe damage that, at best, could be costly and that could, at worse, hazard the vessel.

The present invention solves this problem, and additionally improves the tractability of the French HYSWAS HFWC design in pivotally mounts two peripheral sponsons 86 and 87 to the hull 82. The 1,400 tons of fuel carried by the HYSWAS HFWC is typically loaded into tanks in these sponsons. Although the fuel tanks are thus slightly more exposed to torpedoes in hullborne operational mode, they are substantially no more hazarded in the foilborne operational mode—which is expected to be adopted in a zone of hostilities—than normal. In a way the watertight integrity of the HYSWAS HFWC design is accorded triple redundancy, with the most essential inner hull 82 containing the engines the best protected.

The moveable sponsons 86 and 87 deploy, and are used, in a like manner to the P HFWC shown in FIGS. 1–7 and 10.

Figures 9, 10:
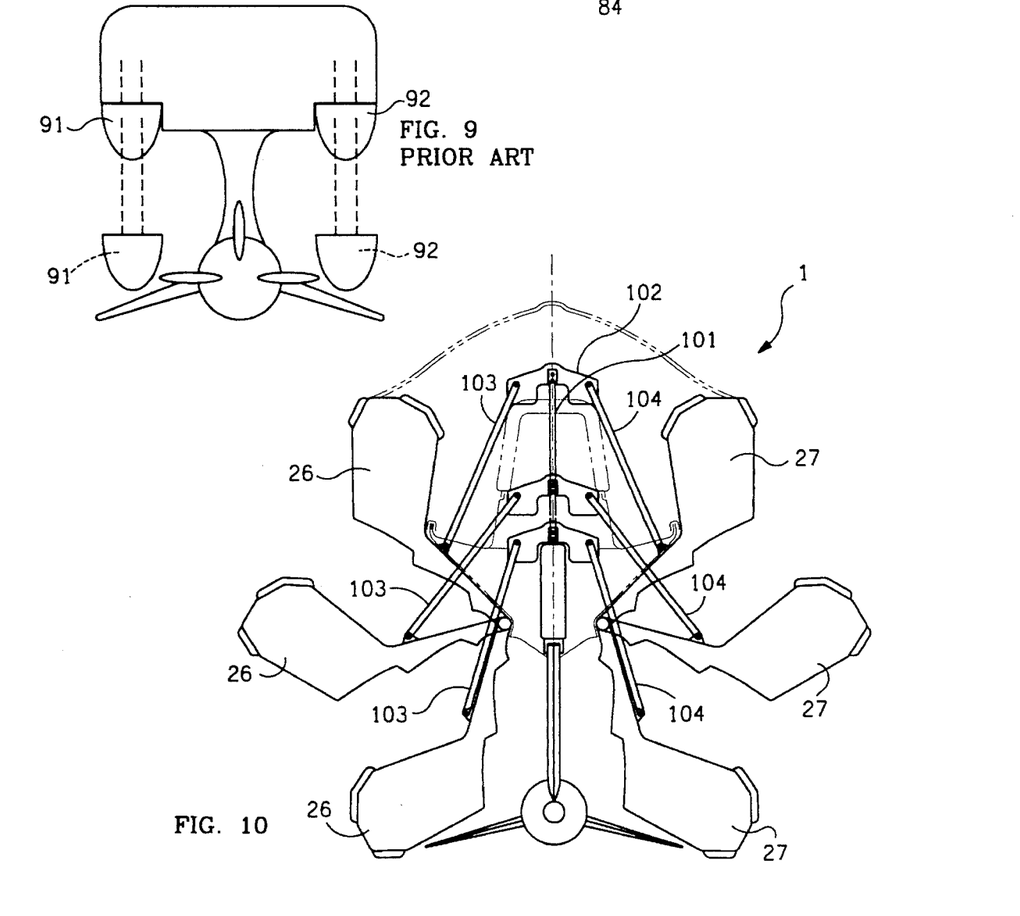
FIG. 9 is a diagram of a prior art system of moveable sponsons for a E-P HFWC of the type previously seen in FIG. 8.
FIG. 10 is a cut-away plan view, taken along aspect line 10—10 shown in FIG. 3, showing the preferred manner of deploying the moveable sponsons of the first embodiment of the present invention as a personal hydrofoil watercraft (P HFWC).

A diagram of a prior art system of moveable sponsons for a E-P HFWC of the general type previously seen in FIG. 8, and more particularly for a HYSWAS HFWC ferry, is shown in FIG. 9. The sponsons 91, 92 are—while moveable—clearly unable to substantially contribute to providing a lifting force during the forward motion of the hull through the water. Moreover, they may not completely protect the hydrofoils in their full down position.

FIG. 10 is a cut-away plan view, taken along aspect line 10—10 shown in FIG. 3, showing the preferred manner of deploying the moveable sponsons of the first embodiment of the present invention as a personal hydrofoil watercraft (P HFWC). The primary purpose of the deployed and moveable foils 91, 92 is ship stabilization. The foils are not directed to alleviating the hump drag under take-off conditions that is normally associated with conventional hydrofoils.

A cut-away plan view, taken along aspect line 10—10 shown in FIG. 3, of the preferred manner of deploying the moveable sponsons of the first embodiment of the present invention as a personal hydrofoil watercraft (P HFWC) is as shown in FIG. 10. A central post, strut, spine or wall 101 attaches a slide mechanism, or yoke, 102. The yoke 102 is driven under human or engine power (as transmitted by mechanical linkage or, more commonly, hydraulics) between positions relatively higher, and relatively lower, along the height of the post 102, and the P HFWC 1. The yoke 102 connects to the moveable sponsons 26, 27 by linkages 103,104. The interior hull 28 (best seen in FIGS. 3–6) is relieved along a watertight channel in which the yoke 102 and the linkages 103, 104 move.

Figure 11:
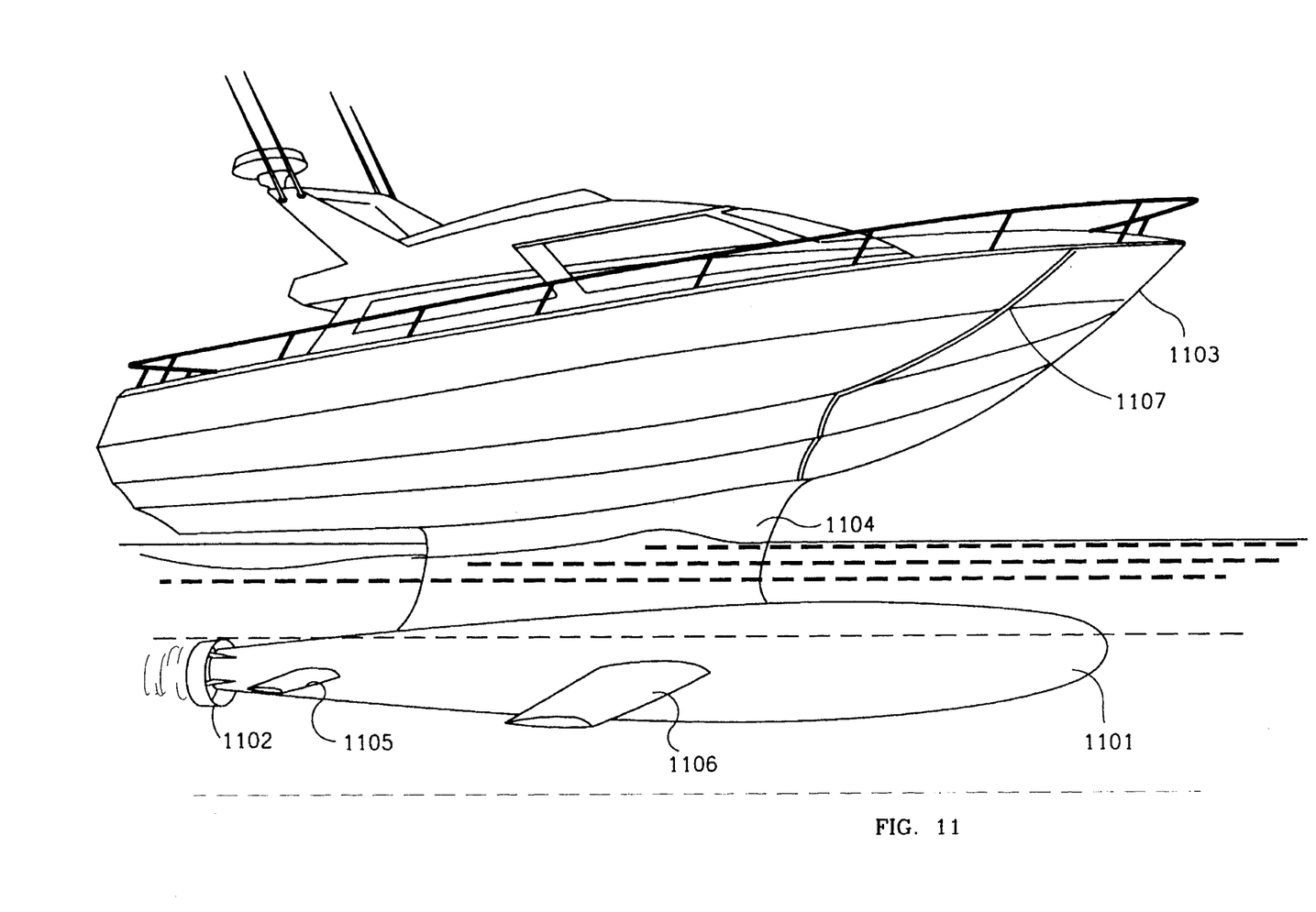
FIG. 11 is a diagrammatic perspective view of an embodiment of an extended performance hydrofoil watercraft (E-P HFWC) in accordance with the present invention on full hydrofoil plane with its moveable sponsons in their retracted positions tightly integrated into a contoured hull; it may be noted from the aspect ratio of the craft, the foils, and the propeller that the illustrated E-P HFWC might be expected to require extreme amounts of propulsive power to come onto the illustrated planing position (should such even be possible for a watercraft of these aspect ratios) but for the operation of its variably positionable sponsons.

A diagrammatic perspective view of an embodiment of an extended performance hydrofoil watercraft (E-P HFWC) in accordance with the present invention is shown in FIG. 11. The E-P HFWC 110 has a large underwater propulsion assembly and demi-hull, 1101 that contains the motor or engine, and that drives the E-P HFWC through propeller 1102. The underwater propulsion assembly and demi-hull 1101 is connected to, and supports, the main hull 1103 through a streamlined support strut, or stanchion 1104. Hydrodynamic resistance to movement through the water of the underwater propulsion assembly and demi-hull 1101 and the streamlined support strut 1104 is much less at high speeds than a normal hull of equivalent displacement to the hull 1103.

The E-P HFWC 110 of FIG. 11 is illustrated to be on full hydrofoil plane on its hydrofoils 1105, 1106. The moveable sponsons 1107 of the E-P HFWC 110 are in their retracted positions tightly integrated into a contoured hull 1103 having a generally modified "V" shape. It may be noted from the aspect ratio of (i) the overall hull 1103 of the E-P HFWC 110, (ii) the foils 1105 and 1106, and (iii) the relatively small propeller 1102, that the entire illustrated E-P HFWC 110 might be expected to require extreme amounts of propulsive power to come onto the illustrated planing position—should such even be possible for a watercraft of these aspect ratios—but for the operation of its variably positionable sponsons 1107. The sponsons 1107 lower, of course, in the manner of FIGS. 3 through 5, in order to promote that the E-P HFWC 110 should rise onto hydrofoil plane on its hydrofoils 1105, 1106.

Figure 12:
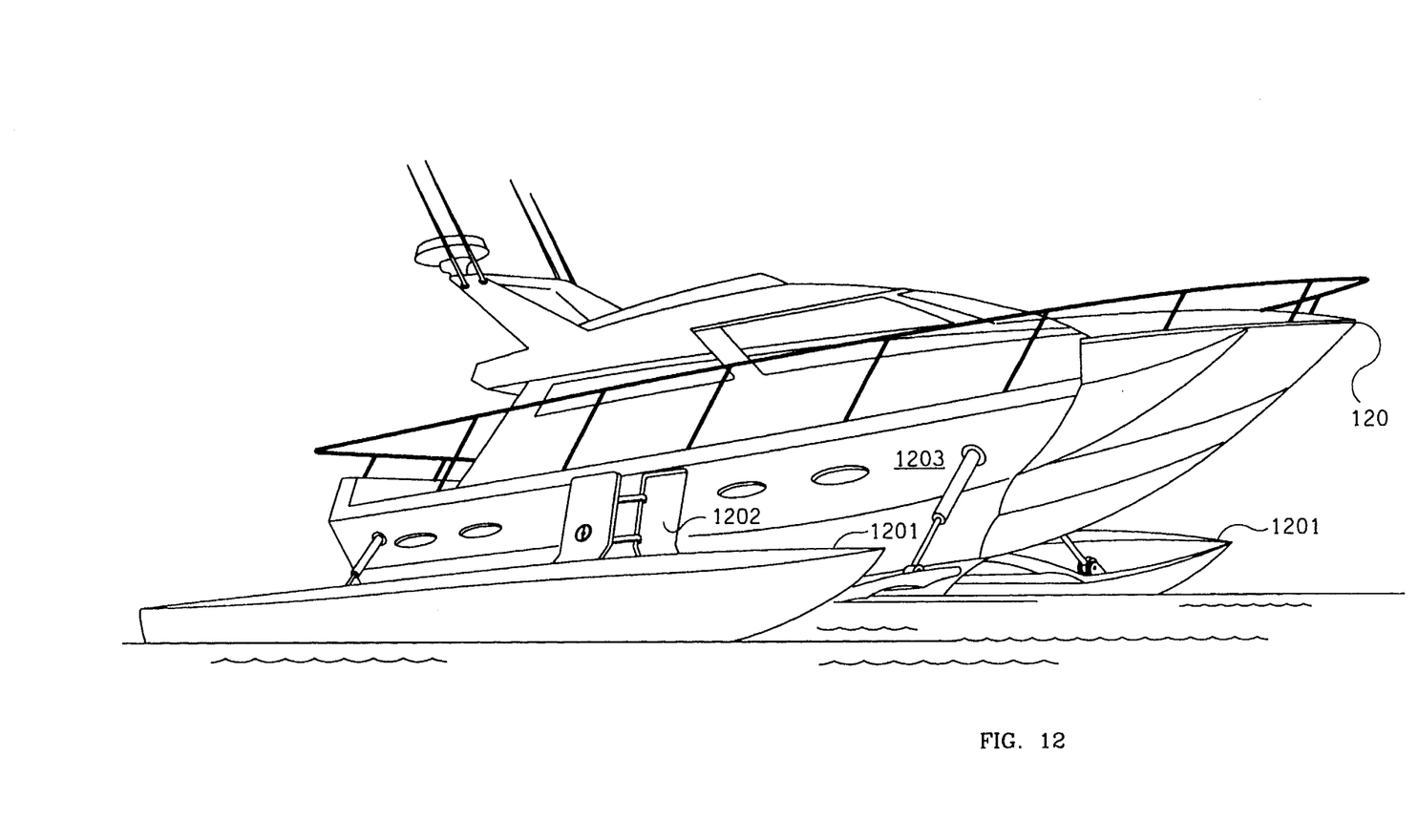
FIG. 12 is a diagrammatic perspective view of an embodiment of a hydrofoil watercraft (HFWC) in accordance with the present invention—optionally but not necessarily the same extended performance hydrofoil watercraft (E-P HFWC) previously seen in FIG. 11—stopped with (i) its moveable sponsons extended, and (ii) a side door, or side hatch, to the inner hull in an open position; it may be noted that access is provided to the interior of the HFWC through the side hatch.

A diagrammatic perspective view of an embodiment of a hydrofoil watercraft (HFWC) 120 in accordance with the present invention is shown in FIG. 12. The HFWC 120 may optionally—but not necessarily—be the same extended performance hydrofoil watercraft (E-P HFWC) 110 previously seen in FIG. 11. The HFWC 120 is illustrated stopped with (i) its moveable sponsons 1201 extended, and (ii) a side door, or side hatch, 1202 to the inner hull 1203 in an open position. It may be noted that good access is provided to the interior of the HFWC 120 through its side hatch 1202.

Moreover, a motorized vehicle (not shown) may typically be driven from the interior of the HFWC 120 through its side hatch 1202 and across the top surface (which is suitably strengthened and contoured and finished) to, perhaps, an adjacent pier or beach (not shown). The HFWC 120 accordingly has some of the elements of an amphibious landing draft, being structured so as to readily disembark men and machines at and onto unimproved shores and piers. Nonetheless to its ability to so perform, the HFWC 120 may, when on its hydrofoils (not shown in FIG. 12), typically progress quite quickly through the water under a broad range of sea states. It should be considered that the location relative to the waterline, and the structural integrity, of the side hatch 1202 is made possible by the (i) lifting, and by the (ii) protective, effects of the moveable sponsons 1202 that are provided at various times, in various positions of the moveable sponsons 1202, and in various operational modes of the HFWC 120.

In accordance with the preceding explanation, variations and adaptations of the hydrofoil personal watercraft (PWC) in accordance with the present invention will suggest themselves to a practitioner of the nautical design arts.

For example, the moveable floats could be replaced with variably inflatable gas bags. The gas bags would normally be so variably inflated by exhaust gases from the engine, or by an on-board air compressor run off the engine.

In accordance with this and other possible variations and adaptations of the present invention, the scope of the invention should be determined in accordance with the following claims, only, and not solely in accordance with those embodiments within which the invention has been taught.

What is claimed is:

1. A hydrofoil watercraft comprising:

a displacement hull of a shape suitable to (i) slice through heavy seas, but ineffective to (ii) provide at a first speed of the watercraft a sufficient lifting force so as to permit the watercraft to come onto a first plane on its hull;

wherein the displacement hull does not suffice to serve as a planing hull at the first speed of the hydrofoil watercraft through the water;

hydrofoils, attached to the hull and extending into the water below the hull, providing at a second speed, faster than the first speed, of the watercraft through the water a second lifting force by which lifting second force the watercraft may come onto a second plane, separate from the first hull plane, on its hydrofoils; and a plurality of sponsons each of which is attached to the hull and which sponsons are collectively moveable between inboard positions both closely proximate to the displacement hull and so integrated into the shape thereof so as support that the displacement hull should slice through heavy seas, outboard positions, separated from the displacement hull, where, at the first speed of the watercraft through the water, a first lifting force is provided by which first lifting force the watercraft comes onto its first, hull, plane;

wherein the watercraft is enabled to come onto its first, hull, plane not by action of its displacement hull but rather by action of its plurality of sponsons in their outboard positions; and wherein the watercraft is enabled to come onto the second plane by its hydrofoils.

2. The hydrofoil watercraft according to claim 1 wherein the plurality of sponsons are further moveable from their inboard positions through their outboard positions to yet other, downward-extending, positions where they extend downward from the hull sufficiently far so that they are lowermost in the water even below the downwards-extending hydrofoils;

wherein if during operation the watercraft was to contact a shallow bottom or a shore of a body of water, then the sponsons in their downward-extending positions will contact this shallow bottom or shore before the hydrofoils do so, protecting the hydrofoils.

3. The hydrofoil watercraft according to claim 1 wherein the displacement hull is of a "V" shape.

4. A hydrofoil watercraft comprising:

a displacement hull of a shape suitable to slice through heavy seas;

hydrofoils, attached to the hull and extending downward into the water below the hull; and a plurality of sponsons each of which is attached to the hull and moveable between an inboard position both closely proximate to the displacement hull and so integrated into the shape thereof so as support and permit that the displacement hull should slice through heavy seas, a downward position extending downwards from the hull sufficiently far so that it is lowermost in the water and below the downward-extending hydrofoils;

wherein the plurality of sponsons in their downward positions serve to contact a shallow bottom or a shore of a body of water in which the watercraft is operated before the hydrofoils do so, protecting the hydrofoils.

5. The hydrofoil watercraft according to claim 4 wherein the displacement hull of a shape suitable to slice through heavy seas is inadequate to provide at a first speed of the watercraft through the water a first lifting force sufficient so that the watercraft may come onto a first plane on its hull;

wherein each of the plurality of sponsons is further moveable to an outboard position, located between its inboard position and its downward position and positionally separated from the displacement hull, at which outboard positions the collective plurality of sponsons provide at the first speed of the watercraft through the water the first lifting force by which the watercraft comes onto its first plane;

wherein the hydrofoils are providing at a second speed, faster than the first speed, of the watercraft through the water a second lifting force by which second force the watercraft may come onto a second plane, separate from the first plane, on its hydrofoils;

wherein the watercraft is enabled to come onto the first plane not by action of its displacement hull but rather by action of its plurality of sponsons collectively in their outboard positions; and wherein the watercraft is still enabled to come onto the second plane by its hydrofoils.

6. The hydrofoil watercraft according to claim 4 wherein the displacement hull is of a "V" shape.

7. A hydrofoil watercraft comprising:

a displacement hull of a "V" shape suitable to slice through heavy seas;

hydrofoils, attached to the hull and extending downward into the water below the hull; and a plurality of sponsons each of which is attached to the hull and moveable between an inboard position both closely proximate to the displacement hull and so integrated into the "V" shape thereof so as to support that the displacement hull should slice through heavy seas, a downwards position extending downward from the hull sufficiently far so that it is lowermost in the water below the downward-extending hydrofoils;

wherein the sponsons in their downwards positions contact a shallow bottom or a shore of a body of water in which the watercraft is operated before the hydrofoils do so, protecting the hydrofoils.

8. The hydrofoil watercraft according to claim 7 wherein the displacement hull of a shape suitable to slice through heavy seas is inadequate to provide at a first speed of the watercraft through the water a lifting force of a magnitude sufficient so as to permit the watercraft may come onto a first plane on its hull;

wherein each of the plurality of sponsons is further moveable to an outboard position, located between its inboard position and its downwards positions and positionally separated from the displacement hull, at which outboard positions the collective plurality of sponsons provide at the first speed of the watercraft through the water a lifting force of a magnitude sufficient so as to permit the watercraft to come onto a first, sponson, plane;

wherein the hydrofoils are providing at a second speed, faster than the first speed, of the watercraft through the water a lifting force of a magnitude sufficient so as to permit the watercraft to come onto a second, hydrofoil, plane that is separate from the first, sponson, plane;

wherein the watercraft is enabled to come onto the first plane not by action of its displacement hull but rather by action of its collective plurality of sponsons in their outboard positions; and wherein, nonetheless to the action of the sponsons, the watercraft is still permitted to come onto its second, hydrofoil, plane by action of its hydrofoils.

9. An improvement to a hydrofoil watercraft having a hull of a shape providing at a first speed of the watercraft through the water a first lifting force by which first force the watercraft may come onto a first plane on its hull, and hydrofoils, attached to the hull and extending downwards into the water below the hull, providing at a second speed of the watercraft through the water a second lifting force by which second force the watercraft may come onto a second plane, distinct from the first plane, on its hydrofoils, the improvement comprising:

a plurality of sponsons each of which is attached to the hull and moveable between an up position both closely proximate to the hull and so integrated into the shape thereof so as to contribute to the production of the first lifting force when the watercraft is at the first speed and on its first plane, and a down position extending downwards from the hull sufficiently far so that they are lowermost in the water below the downwards-extending hydrofoils;

wherein the sponsons in their up positions aid the watercraft to come onto its first plane at the first speed;

wherein the sponsons in their down positions contact a shallow bottom or a shore of a body of water in which the watercraft is operated before the hydrofoils, protecting the hydrofoils.

10. The improvement to a hydrofoil watercraft according to claim 9 wherein the plurality of sponsons attached to the hull are each capable of further assuming an intermediary position located between the first position and the second position and, when so positioned, will continue during movement of the hydrofoil through the water at the first speed to contribute to the first lifting force, by which first lifting force the watercraft may come onto the first plane both on its hull and on its sponsons located in their intermediary positions;

wherein the sponsons contribute to the development of the first lifting force by which the hydrofoil watercraft may come onto its first plane in both their up, hull-integrated, positions and also in their intermediate positions, 11. The improvement to a hydrofoil watercraft according to claim 9 wherein the hull comprises:

a "V" hull with the plurality of sponsons integrated into the curvature of the "V".

12. An improvement to a hydrofoil watercraft having a hull of a shape providing at a first speed of the watercraft through the water a first lifting force by which first lifting force the watercraft may come onto a first plane on its hull, and hydrofoils, attached to the hull and extending into the water below the hull, providing at a second speed of the watercraft through the water a second lifting force by which second lifting force the watercraft may come onto a second plane, distinct from the first plane, on its hydrofoils, the improvement comprising:

a plurality of sponsons each of which is attached to the hull and moveable between an up position both closely proximate to the hull and so integrated into the shape thereof so as to contribute to the production of the first lifting force when the watercraft is at the first speed and coming on, or on, its first plane, and an outward-extending position extending outward from the hull and no longer integrated into the shape thereof, where it contributes, during movement of the hydrofoil through the water at the first speed, to producing an augmented first lifting force by which augmented lifting force the watercraft may not only come onto the first plane, but may continue higher in the water on the first plane once planing;

wherein the plurality of sponsons contribute to producing the first lifting force, by which lifting force the watercraft may come onto plane, when they are in either of their up, or their outward-extending, positions;

wherein the contribution of the sponsons to the development of the augmented first lifting force when they are in their outward-extending positions helps, by positioning the watercraft higher in the water, that it should come onto its second plane on its hydrofoils.

13. The improvement to a hydrofoil watercraft according to claim 12 wherein the plurality of sponsons attached to the hull are each capable of further assuming a down position extending downwards from the hull sufficiently far so that they are lowermost in the water below the downwards-extending hydrofoils;

wherein the sponsons in their down positions contact a shallow bottom or a shore of a body of water in which the watercraft is operated before the hydrofoils, protecting the hydrofoils.

14. The improvement to a hydrofoil watercraft according to claim 12 wherein the hull comprises:

a "V" hull with the plurality of sponsons integrated into the curvature of the "V".

15. A method of adjusting the lift of a hydrofoil watercraft having a hull of a shape providing at a first speed of the watercraft through the water a first lifting force by which first force the watercraft may come onto a first plane on its hull, and hydrofoils, attached to the hull and extending into the water below the hull, providing at a second speed, higher than the first speed, of the watercraft through the water a second lifting force by which second force the watercraft may come onto a second plane, separate from the first plane, on its hydrofoils, over a dynamical range as the watercraft comes from (i) a stationary position not on plane, to (ii) a first speed at which the watercraft comes onto its first plane, to (iii) a second speed at which the watercraft comes onto its first plane, to the end of making this process faster and smoother for the same amount of energy expended, the method of getting a hydrofoil watercraft onto hydrofoil plane quickly and smoothly comprising:

starting the watercraft from a stationery position whereat the hull assumes a substantially contiguous "V" shape of a lifting body, which "V"-shape lifting body hull tends to force the watercraft higher in the water with increasing speed though the water; and then as the watercraft picks up speed and rises higher in the water on its "V"-shape lifting body hull, progressively extending sponsons downwards from the moving hull which sponsons, nonetheless to their extension and their progressively increasing extension, also continuously serve as "V" shaped lifting bodies, the downwards-extending sponsons tending to force the watercraft ever higher in the water with increasing speed through the water even as the "V"-shape lifting body hull alone suffers progressively diminished ability to lift the hull higher in the water; and finally roughly as the sponsons become maximally extended, reaching the second speed at which the watercraft goes onto its second plane at roughly the height above the water already obtained;

wherein the watercraft more quickly increases speed in the water from the first speed to the second speed on its extended sponsons than it would if the sponsons were not so extended because the sponsons and hull together lift more, providing less drag, than the hull alone;

wherein, because a first freeboard of the watercraft in the water on its first plane at its first speed is less than a second freeboard of the watercraft in the water on its second plane at its second speed, then the progressive extension of the sponsons helps to smooth the transition from the first freeboard to the second freeboard;

wherein the progressive extension of the sponsons makes the process of coming onto the second plane at the second speed both faster and smoother for the same amount of energy expended.

16. The method according to claim 15 which, after the reaching and when the hydrofoil watercraft is on hydrofoil plane, further comprises:

retracting the extended sponsons to positions substantially contiguous with the "V" shaped lifting body hull.

\* \* \* \* \*